United States Statutory Invention Registration [19]

[11] Reg. Number: H144

Savioli [43] Published: Oct. 7, 1986

[54] WEAPON TRIGGER AND SEAR MECHANISM

[75] Inventor: Giulio V. Savioli, Andover, N.J.

[73] Assignee: The United States of America as represented by the Secretary of the Army, Washington, D.C.

[21] Appl. No.: 713,133

[22] Filed: Mar. 18, 1985

[51] Int. Cl.[4] ..... F41D 11/02

[52] U.S. Cl. ..... 89/142; 89/143; 89/185

*Primary Examiner*—Stephen C. Bentley

*Attorney, Agent, or Firm*—Anthony T. Lane; Harold H. Card, Jr.; Michael C. Sachs

[57] ABSTRACT

A firing mechanism for a weapon having a receiver with a chamber for a cartridge comprises a bolt and piston which are separately movable toward and away from the chamber and which are engaged with each other for displacing and rotating the bolt into a locked firing position. A buffer is also movable in the receiver and can strike the rear end of the piston. The piston carries a firing pin which can thus be driven into the primer of a cartridge in the chamber. Three sears are provided. Two of the sears are for engaging the piston, one sear for holding the piston in a position with its firing pin away from the cartridge but with the bolt against the chamber and in its locked position. The other sear for the piston holds the piston with the bolt in a position away from the chamber. This is for open bolt operation. A third sear is provided for engaging the buffer for closed bolt operation. A fire selector is provided which can act as a safety and which provides an automatic and a semi-automatic position for stopping rotation of the sears at appropriate positions for automatic or semi-automatic fire.

12 Claims, 14 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WEAPON TRIGGER AND SEAR MECHANISM

STATEMENT OF GOVERNMENT INTEREST

The invention described herein may be manufactured, used and licensed by or for the Government for Governmental purposes without the payment to me of any royalties thereon.

FIELD AND BACKGROUND OF THE INVENTION

The present invention relates in general to small arms and in particular to a new and useful mechanism in an automatic weapon which permits firing of the weapon in either automatic or semi-automatic mode, with an open or a closed bolt.

Automatic weapons are known which include a fire selector which has three positions. The first position is generally a safety which prevents accidental firing of the weapon. The next position is generally a semi-automatic position which permits firing of a single round each time the trigger is depressed. In order to fire again the trigger must be released and pulled again. The fire selector can be placed into its third position for establishing automatic fire wherein the weapon continues to fire one round after the other while the trigger is held. This continues until the trigger is released or until all the ammunition has been expended. Weapons are also known which can operate from a so called closed bolt condition or a so called open bolt condition. A weapon which operates with a closed bolt can only fire when a bolt is seated up against a cartridge in a chamber of the weapon. The cartridge is fired when its primer is struck by a firing pin. This mode of operation is desirable during normal use of a fire arm since accurate aiming is easier due to the lack of large moving masses after the trigger is pulled and the chamber is closed against exterior contamination.

Weapons which use an open bolt include a sear which holds the bolt in a position spaced away from the chamber. Upon pulling the trigger the bolt is released. This generally causes the stripping of a cartridge from a magazine. The cartridge is then pushed into the chamber and immediately ignited by a firing pin. This mode of operation is desirable when firing long continuous bursts that generate substantial amounts of heat. If a barrel is sufficiently heated, it can cause unintentional discharge (cook-off) of a cartridge in the chamber. This mode of operation is generally used in machine guns while a closed bolt mode of operation is generally used in rifles.

SUMMARY OF THE INVENTION

The present invention is drawn to a trigger and sear mechanism for a weapon which permits the selection of either an open bolt or a closed bolt mode of operation, and the further selection of an automatic or a semi-automatic firing. The automatic firing can take place with either an open or a closed bolt and the semi-automatic firing can take place with either an open or a closed bolt.

According to the invention thus the best mode of operation can be selected. For example during long periods of automatic fire, the weapon is placed in its open bolt mode to avoid the cook-off effect. Where accuracy in aiming and less frequent firing is anticipated the weapon is placed in its closed bolt mode.

Accordingly an object of the invention is to provide a firing mechanism for a weapon having a receiver with a chamber for a cartridge, comprising, a bolt movably mounted to the receiver toward and away from the chamber for holding a cartridge in the chamber and movable to a locked and unlocked position near the chamber a piston movably mounted to the receiver toward and away from the chamber and having a firing pin movable against a cartridge in the chamber to ignite the cartridge, the piston engaged with the bolt for moving the bolt toward and away from the chamber and between its locked and unlocked positions, and a buffer movably mounted to the receiver toward and away from the piston for striking the piston or moving with the piston for engaging the firing pin with a cartridge in the chamber. Springs are engaged to the buffer and the piston for urging both elements toward the chamber. A first sear is movably mounted to the receiver and is engageable with the piston for holding the firing pin away from a cartridge in the chamber. A second sear is movably mounted to the receiver for holding the buffer away from the chamber. A third sear is provided which is also movably mounted to the receiver for holding the piston in a position against the buffer and more distant from the chamber than when the piston is held by the first sear. A trigger is mounted to the receiver and is engageable with the first, second and third sears for moving each of the sears into a non-engaging position for releasing the piston and buffer. A fire selector is rotatably mounted to the receiver for blocking movement of the first, second and third sears in a safety position thereof. A second position of the fire selector permits movement of the sears into a first release position thereof which permits automatic fire. The fire selector has a further position which permits the trigger to become disengaged from the sears for semi-automatic fire. A bolt position selector is also provided which engages the third sear and has a first position for placing the third sear in a range for engaging the piston in its rearmost position, and a second position for permitting the free movement of the piston.

A further object of the invention is to provide a mechanism for a weapon which permits open bolt, closed bolt, automatic and semi-automatic fire.

A still further object of the invention is to provide such a weapon which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
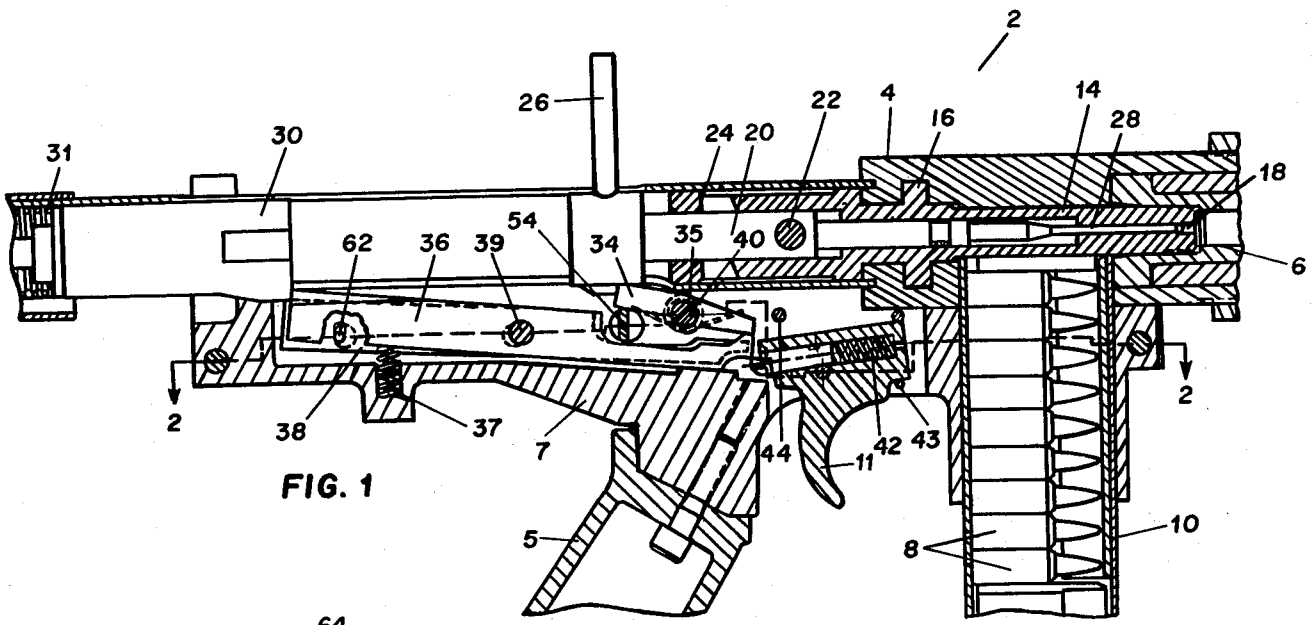
FIG. 1 is a partial side sectional view of an automatic weapon illustrating the mechanism of the present invention.
Figure 2:
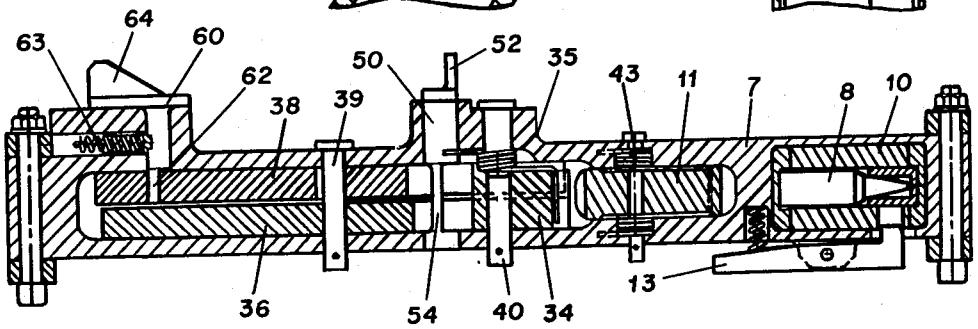
FIG. 2 is a sectional view taken along the lines 2—2 of FIG. 1.

Referring to the drawings in particular, the invention embodied in FIGS. 1 and 2 is a mechanism for a weapon generally designated 2 which includes a receiver 4 having a chamber 6 for cartridges shown at 8 in a magazine 10 attached to a lower housing 7 connected to the receiver 4.

A handle 5 is connected to the lower housing 7 and a trigger 11 is pivotally mounted to the lower housing 7. Trigger 11 is held in its shown undepressed position by a torsion spring 43 which holds trigger 11 against a first stop 45. The trigger can be pulled to the rear until it strikes a second stop 44. A plunger 41 is movable in a recess of trigger 11 and is biased into its outward position by a plunger spring 42. The plunger 41 engages a first sear 34 which is pivotally mounted to the housing 7 by raising the rear end of a second sear 36 which has a projection engaging the first sear 34. A third sear 38 is also provided and is movable by the plunger 41.

First sear 34 is rotatably mounted to the housing about a pin 40 and is held in the position shown in FIG. 1 by a torsion spring 35. Second sear 36 is held in the position shown in FIG. 1 by a spring 37 and is mounted for pivoting about a pin 39.

Third sear 38 is mounted for pivoting and a small amount of linear motion about pin 39 which extends through an elongated slot in the third sear 38. The position of sear 38 is determined by an eccentric pin 64 of a bolt position selector 60. By rotating selector 60 using handle 64, the position of eccentric pin 62 in an elongated slot of third sear 38 positions the third sear either in a downward position out of the range of movement of a piston 20 (which will be described in greater detail later) and into a second position in the path of movement of at least a part of the piston 20.

Figure 3:
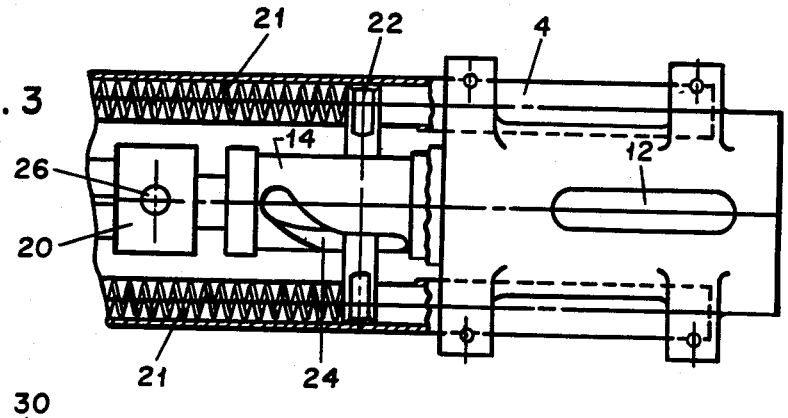
FIG. 3 is a partial top plan view of FIG. 1, partially in section and showing the piston springs and manner of engagement of the piston and the bolt of the weapon.

As shown in FIGS. 1 and 2, piston 20 includes a rear portion from which a manual cycling handle 26 extends. Handle 26 extends up through a slot on the top of receiver 4 and can be drawn to the rear against the bias of piston springs 21 (FIG. 3) which bear against a cross pin 22. Cross pin 22 rides slots in the receiver to prevent the rotation of piston 20 and also extends through helical slots 24 in bolt 14. The backward movement of piston 20 thus causes rotation of bolt 14 to move it into an unlocked position. Bolt 14 includes cam members 16 which rotate into slots in the receiver to lock the bolt against a cartridge in chamber 6. When a cartridge is ignited the expanding gases cause piston 20 to be blown back, first causing rotation of bolt 14 and then carrying bolt 14 backwards in the receiver 4. Bolt 14 includes an ejector 18 which engages a casing of the cartridge and ejects it upwardly through the ejection slot 12 in the top of receiver 4.

As shown in FIG. 2, magazine 10 can be removed from the receiver 4 by depressing the rear of a magazine release handle 13.

Piston 20 includes a firing pin 28 which extends axially through the center of bolt 14. In the position shown in FIG. 1, the safety position, piston 20 is held with firing pin 28 spaced away from a cartridge in chamber 6 by first sear 34 which is engaged against a step at the lower end of piston 20. Sear 34 is held in this position by the flat plate 54 of a fire selector 50. Fire selector 50 has a handle 52 which is external of the housing 7 for permitting rotation of the fire selector 50. In the position shown in FIG. 1, plate 54 also holds sears 36 and 38 downward so that the rear end of sear 36 engages against a buffer 30. The sear 38 does not engage with the buffer or the piston but in any case is held down by the plate 54.

Buffer 30 is held back against the bias of a buffer spring 31 which is sufficiently long to move buffer 30 to the right as shown in the FIG. 1 and impact against the rear end of piston 20 to ignite a cartridge in chamber 6. This is only if piston 20 is released for movement by first sear 34 however.

With the foregoing structure of the invention explained, reference is now made to FIGS. 4 through 14 which illustrate the position and movements of relevant parts of the invention during the four modes of operation for the weapon.

Figure 4:
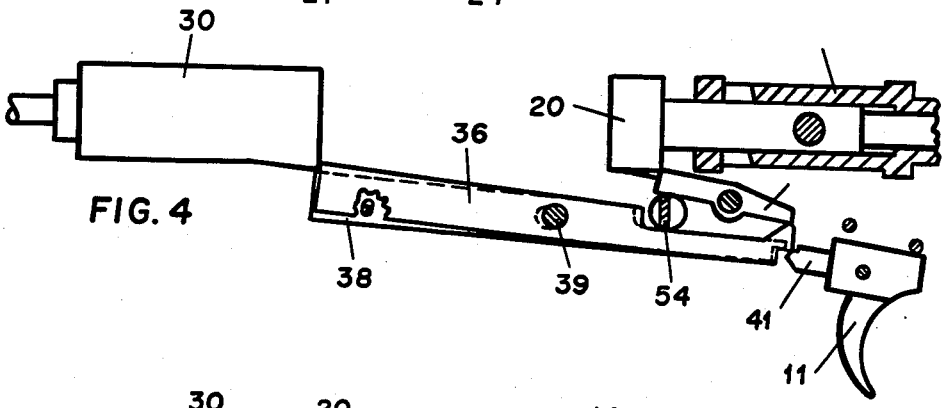
FIG. 4 is a partial side elevational view of the inventive mechanism in a safety configuration.

FIG. 4 shows the safety position with the flat central bar 54 blocking counter clockwise rotation of first sear 34 which prevents movement of the sears or the trigger 11.

Figure 5:
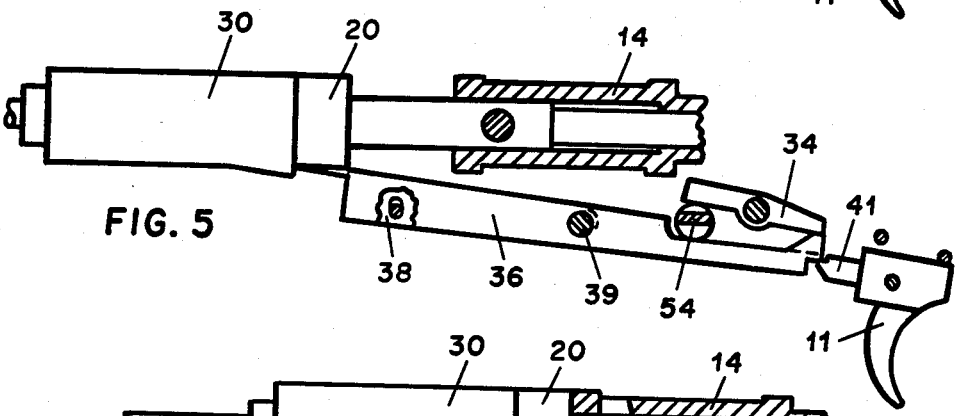
FIG. 5 is a view similar to FIG. 4 of the weapon in a position ready for automatic fire and in an open bolt mode of operation.

FIG. 5 shows the position of fire selector plate 54 for full automatic/open bolt operation. Third sear 38 is engaged with piston 20 which holds piston 20 back against buffer 30 as well as against the piston springs 21 and the buffer spring 31. The position of first selector plate 54 is above its center to permit only limited rotational movement of sear 34 which in turn permits sufficient movement of sears 36 and 38 to disengage sear 38 from piston 20 and remove sear 36 from the path of forward movement for buffer 30.

Figure 6:
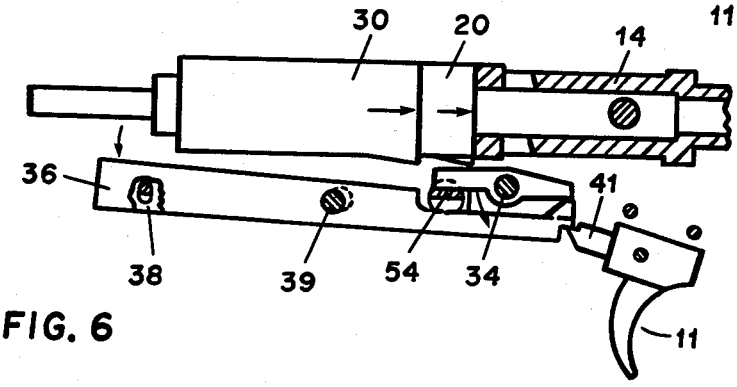
FIG. 6 is a view similar to FIG. 5 showing the position of parts after the trigger has been pulled.

FIG. 6 shows the movement of parts, by the use of arrows, when trigger 11 is rotated clockwise. This causes plunger 31 to lift the forward end of sears 36,38 and also to rotate sear 34 counter clockwise until it bears against the top surface of plate 54. This causes the forward movement (to the right in FIG. 6) of piston 20 and buffer 30 under the influence of their respective springs 21,31. Piston 20 proceeds forward until bolt 14 is seated and rotated into its locking position and the firing pin of piston 20 ignites a cartridge seated in the chamber. It is noted that the cartridge had been stripped from the magazine by the forward movement of bolt 14 in known manner for known weapons firing from an open bolt.

Figure 7:
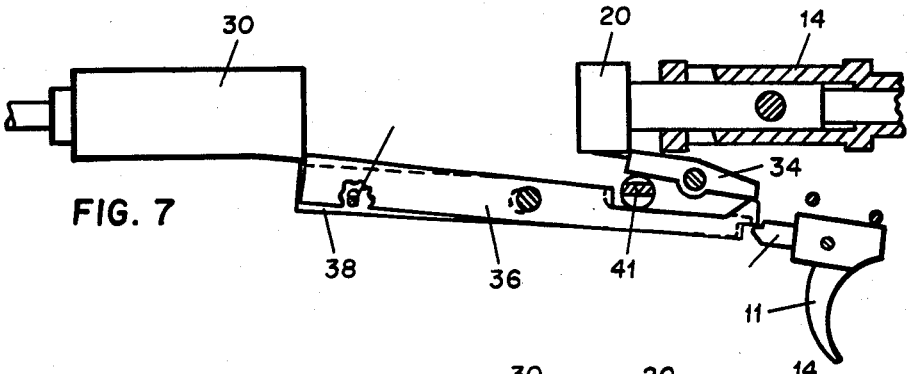
FIG. 7 is a view similar to FIG. 5 showing the initial position of the inventive mechanism for automatic operation from a closed bolt.

FIG. 7 shows the initial position of parts where the weapon is set for full automatic/closed bolt operation. For this operation the eccentric pin 62 of the bolt position selector 64 has been rotated to pivot the third sear 38 counter clockwise and out of the path of movement of piston 20. The center plate of bar 54 of the fire selector remains in the same position as in FIGS. 5 and 6. Sear 36 is engaged against buffer 30 to hold it back against its spring 31 while sear 34 engages piston 20 to hold it back against the bias of its spring 21 thus holding its firing pin away from the cartridge which is seated in the chamber and held against the chamber by the locked bolt 14.

Figure 8:
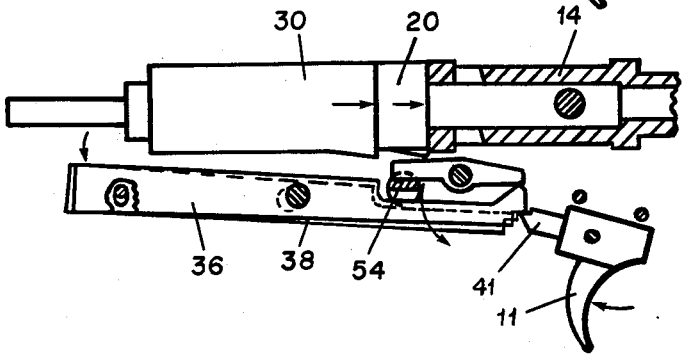
FIG. 8 is a view similar to FIG. 7 showing the position of parts after the trigger has been pulled.

As shown in FIG. 8, when the trigger 11 is pulled its plunger 41 raises the forward end of both sears 36 and 38. This engages sear 36 from buffer 30. Simultaneously the sear 34 is rotated to disengage piston 20 so that by the time the buffer 30 strikes the rear end of piston 20, piston 20 is free for forward movement to cause its firing pin to ignite the cartridge.

Figure 9:
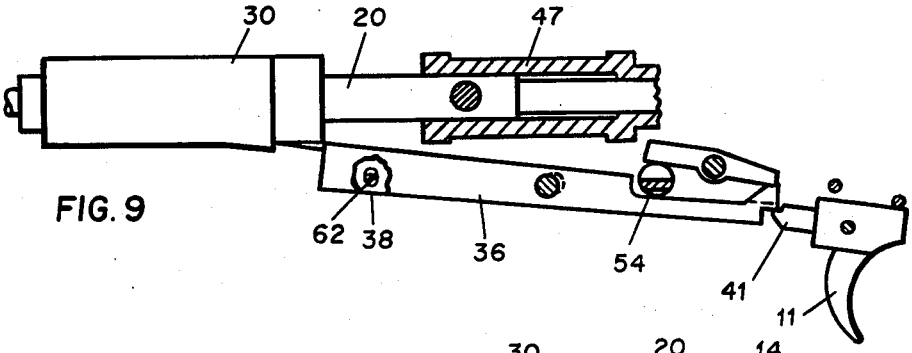
FIG. 9 is a view similar to FIG. 7 showing the position of parts for semi-automatic firing from an open bolt.

FIG. 9 shows the initial position of parts for semi-automatic/open bolt operation. To achieve this mode of operation the eccentric pin 62 of the bolt position selector has been rotated to turn the third sear 38 clockwise so that it is in the path of movement of a portion of the piston 20. When piston 20 and the buffer 30 are blown back or manually pulled back sear 38 engages piston 20 to hold it in its rearward or open bolt position.

The fire selector is rotated so that its central bar or plate 54 is slightly below center which permits additional rotational movement of sear 34 when trigger 11 is pulled.

Figure 10:
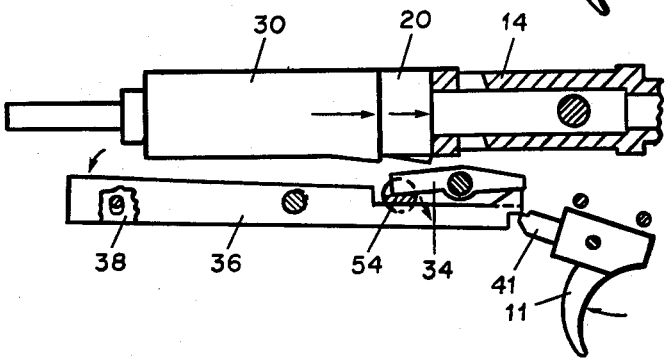
FIG. 10 is a view similar to FIG. 9 showing the position of parts after the trigger has been pulled.
Figure 11:
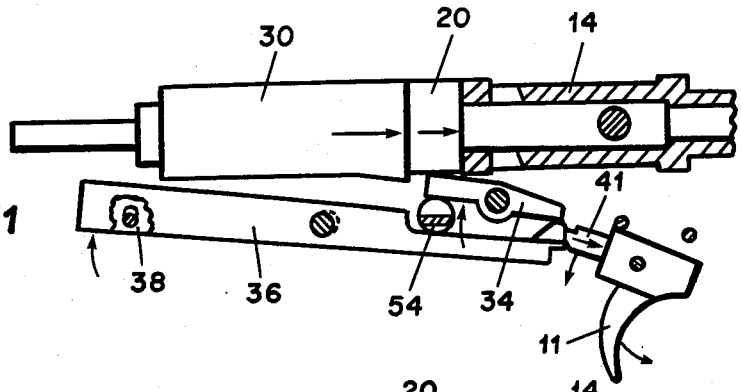
FIG. 11 is a view similar to FIG. 10 showing the position of parts as the trigger is released.

As shown in FIG. 10, trigger 11 is pulled to lift the forward end of sears 36,38 and to rotate sear 34 counter clockwise against the now new top surface of plate 54. This releases buffer 30 and piston 20 for forward movement so that, by the action of bolt 14, a cartridge is stripped from its magazine, seated in its chamber and ignited, in rapid succession.

It is noted that plunger 41 is selected to have a length so that, with sear 34 in the position shown in FIG. 10, the plunger 41 will rotate past the forward ends of sears 36 and 38. This brings the trigger 11 into the position shown in FIG. 11. In this position, after a single round is fired, the buffer and piston will be caught and held back in their open bolt position (as shown in FIG. 9). To permit the release of trigger 11, the spring loaded plunger 41 moves into the recess of the trigger to permit the trigger to rotate counter clockwise into its initial position (by the aid of its spring shown in FIG. 1 at 43).

Figure 12:
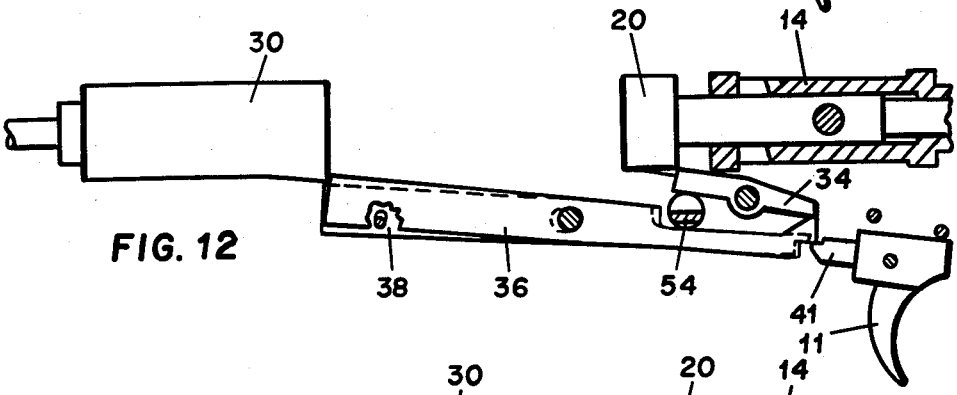
FIG. 12 is a view similar to FIG. 9 showing the initial position of parts for semi-automatic firing from a closed bolt.
Figure 13:
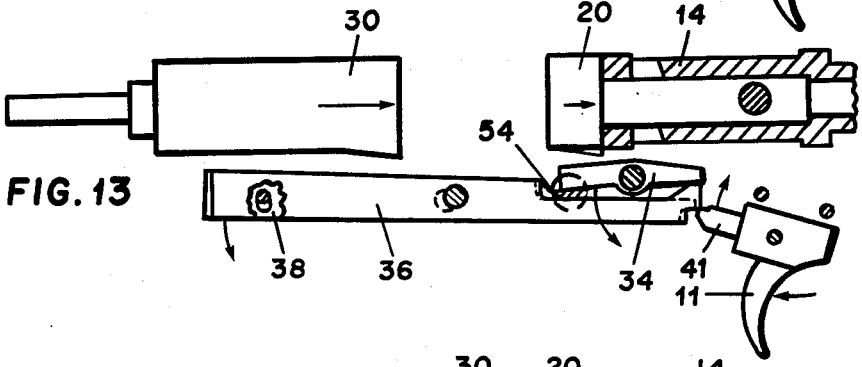
FIG. 13 is a view similar to FIG. 12 showing the position of parts immediately after the trigger is pulled.
Figure 14:
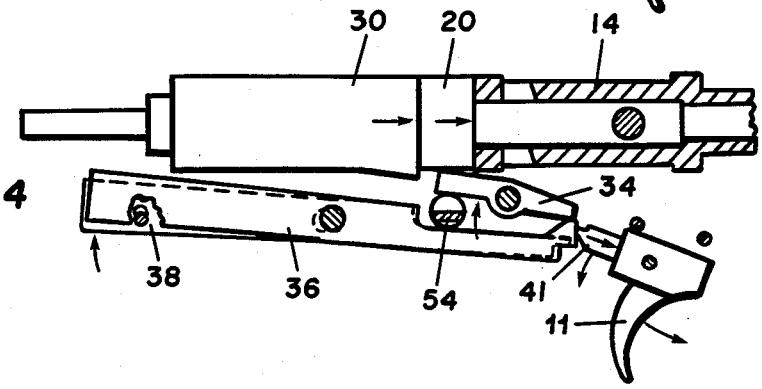
FIG. 14 is a view similar to FIG. 13 showing the position of parts when the trigger is about to be released.

FIG. 12 shows the initial position of parts for semi-automatic/closed bolt operation. To achieve this mode of operation the bolt position selector has been rotated to bring sear 38 out of the path of movement of piston 20 and the fire selector has been rotated for semi-automatic operation as in FIGS. 9 through 11. Pulling the trigger as shown in FIG. 13 causes sear 36 to disengage from buffer 30 and sear 34 to disengage from piston 20 permitting firing of a cartridge which is held and locked in the chamber by closed bolt 14. Semi-automatic operation is achieved because trigger 11 is pulled sufficiently to slip off the edges of sears 36 and 38 and to come into the position shown at FIG. 14. Releasing the trigger permits the trigger to return to its initial position since plunger 41 is retracted against the bias of its spring into the trigger.

While a specific embodiment of the invention has been shown and described in detail to illustrate the application of the principles of the invention, it will be understood that the invention may be embodied otherwise without departing from such principles.

What is claimed is:

1. A firing mechanism for a weapon having a receiver with a chamber for a cartridge, comprising:

a bolt movably mounted to the receiver toward and away from the chamber for holding a cartridge in the chamber, and movable between a locked and an unlocked position near the chamber;

a piston movably mounted to the receiver toward and away from the chamber, said piston having a firing pin movable into engagement with a cartridge in the chamber for igniting the cartridge, said piston having a first position spaced away from the chamber for open bolt operation, a second position adjacent the chamber with the pin spaced away from the chamber for closed bolt operation and a third position with the pin moved toward the chamber for igniting a cartridge in the chamber, said piston engaged with said bolt for moving said bolt toward and away from the chamber and for moving said bolt between its locked and unlocked position;

a buffer movably mounted to the receiver toward and away from the piston for moving the piston from its second position to its third position to ignite a cartridge, said buffer having a first position spaced away from said chamber and a second position adjacent said chamber for engaging said piston in said second position of said piston;

a trigger movably mounted to the receiver;

a first sear rotatably mounted to the receiver and having a first position in a path of movement of said piston and a second position out of the path of movement of said piston, said first sear positioned to engage said piston in said second position of said piston;

a second sear rotatably mounted to the receiver and engageable with said trigger for movement of said second sear with movement of said trigger, said second sear having a portion engaged with said first sear for movement of said first sear with movement of said trigger, said second sear being pivotable between a first position for engagement with said buffer in said first position of said buffer and a second position for movement out of a path of movement of said buffer;

a third sear pivotally mounted to the receiver having a first position for engaging said piston in said first position of said piston and a second position for moving out of the path of movement of said piston;

a buffer spring engaged with said buffer for biasing said buffer towards the chamber;

a piston spring engaged with said piston for biasing said piston toward the chamber;

a bolt position selector movably mounted to the receiver and engaged with said third sear for moving said third sear into its first position and into its second position for selecting open or closed bolt operation; and a fire selector movably mounted to the receiver into an automatic fire position and a semi-automatic fire position, said automatic fire position disposed to engage said first sear in its second position while said trigger maintains engagement with said second sear for holding said first and second sears out of a path of movement of said buffer and piston, said semi-automatic fire position engaging said first sear when it rotates beyond said second position thereof for permitting said trigger to move past said second sear for permitting said first and second sears to return to their respective first positions in the path of movement of said buffer and piston respectively.

2. A firing mechanism according to claim 1, wherein said fire selector includes a central plate, said fire selector having a safety position for blocking pivotal movement of said first and second sears, said plate being on one side of a central axis of said firing selector for establishing said automatic fire position with said plate above said axis and said semi-automatic fire position with said plate below said axis.

3. A firing mechanism according to claim 2, wherein said trigger includes a recess with a plunger movable therein and a plunger spring biasing said plunger outwardly of said recess, said plunger being movable into said recess against the bias of said plunger spring for permitting movement of said trigger past said second sear.

4. A firing mechanism according to claim 1, wherein said piston includes a cross pin, said bolt having a central opening therethrough for receiving said piston and helical slots for receiving said cross pin for causing rotation of said bolts between its locked and unlocked positions and displacement of said bolt toward and away from the chamber.

5. A firing mechanism according to claim 4, wherein said piston spring is engaged against said cross pin.

6. A firing mechanism according to claim 1, wherein said bolt position selector has a axis of rotation and a pin extending eccentrically of said axis of rotation and parallel to said axis of rotation, said third sear having an opening therein for receiving said eccentric pin.

7. A firing mechanism according to claim 6, wherein said fire selector includes a central plate, said fire selector having a safety position for blocking pivotal movement of said first and second sears, said plate being on one side of a central axis of said firing selector for establishing said automatic fire position with said plate above said axis and said semi-automatic fire position with said plate below said axis.

8. A firing mechanism according to claim 7, wherein said trigger includes a recess with a plunger movable therein and a plunger spring biasing said plunger outwardly of said recess, said plunger being movable into said recess against the bias of said plunger spring for permitting movement of said trigger past said second sear.

9. A firing mechanism according to claim 8, wherein said piston includes a cross pin, said bolt having a central opening therethrough for receiving said piston and helical slots for receiving said cross pin for causing rotation of said bolts between its locked and unlocked positions and displacement of said bolt toward and away from the chamber.

10. A firing mechanism according to claim 9, wherein said piston spring is engaged against said cross pin.

11. A firing mechanism according to claim 10, wherein said piston includes a manually cycling handle extending outwardly of the receiver for manually retracting said piston away from the chamber against said piston spring.

12. A firing mechanism according to claim 11, including a second sear spring engaged with said second sear for biasing said second sear into its first position.

* * * * *